United States Patent [19]

Kukla

[11] Patent Number: 4,918,703
[45] Date of Patent: Apr. 17, 1990

[54] SLAB GEOMETRY LASER MATERIAL WITH CONCAVE EDGES

[75] Inventor: Mark J. Kukla, Ballston Spa, N.Y.

[73] Assignee: General Electric Company, Schenectady, N.Y.

[21] Appl. No.: 341,394

[22] Filed: Apr. 21, 1989

[51] Int. Cl.[4] .............................................. H01S 3/06
[52] U.S. Cl. ...................................... 372/66; 372/39; 372/70; 372/72
[58] Field of Search ........................ 372/39, 66, 70, 72

[56] References Cited

U.S. PATENT DOCUMENTS

| | | | |
|---|---|---|---|
| 3,397,362 | 8/1968 | Grayson et al. | 372/66 |
| 3,477,037 | 11/1969 | Seitz | 372/66 |
| 3,498,693 | 3/1970 | Fein et al. | 372/66 |
| 3,513,402 | 5/1970 | Marrison | 372/66 |
| 3,530,397 | 9/1970 | Suzuki et al. | 372/66 |
| 3,532,879 | 10/1970 | Braunstein et al. | 372/66 |
| 3,533,013 | 10/1970 | Seitz | 372/66 |
| 3,560,872 | 2/1971 | Heimann | 372/66 |
| 3,633,126 | 1/1972 | Martin et al. | 331/94.5 |
| 3,679,999 | 7/1972 | Chernock | 331/94.5 |
| 3,684,980 | 8/1972 | Kay | 372/66 |
| 4,088,964 | 5/1978 | Clow | 372/103 |

OTHER PUBLICATIONS

D. C. Brown et al., "Parasitic Oscillations and Amplified Spontaneous Emission in Face—Pumped Total Internal Reflection Lasers," SPIE, vol. 736, pp. 74-83, 1987.

D. C. Brown et al., "Parasitic Oscillations, Absorption, Stored Energy Density and Heat Density in Active—Mirror and Disk Amplifiers", Applied Optics, Jan. 15, 1978, vol. 17, No. 2, pp. 211-224.

Primary Examiner—William L. Sikes
Assistant Examiner—Georgia Y. Epps
Attorney, Agent, or Firm—Geoffrey H. Krauss; James C. Davis, Jr.; Marvin Snyder

[57] ABSTRACT

A substantially rectangular slab of laser material has a pair of opposing concave edge faces to reduce parasitic oscillations. The concavities can be curved in either the transverse or longitudinal directions or both, i.e., they are toroidal sections. The slab can be Nd:YAG. Brewster ends and chamfered corners can be provided for the slab as well as tapered portions for the concavities. In a laser, the concave portions have a length slightly greater than that of the pump lamps. A pair of siderails are over the concave portions to reduce optical distortion.

20 Claims, 2 Drawing Sheets

SLAB GEOMETRY LASER MATERIAL WITH CONCAVE EDGES

BACKGROUND OF THE INVENTION

The present invention relates to a slab geometry solid state laser medium, and more particularly, to such a material that has concave edge surfaces to reduce parasitic oscillations.

The rectangular cross-section, slab geometry, face-pumped laser (FPL), such as shown in U.S. Pat. No. 3,633,126, has an optically pumped laser material. Such a material 10 is shown in the present FIG. 1(a), wherein the pump energy is applied to at least one of the pump faces 12a an 12b by flash tubes (not shown). The ends 14a and 14b comprise edge faces. However, such a laser material 10 is prone to internal parasitic oscillations caused by total internal reflections(TIR) in a closed-loop light path 16a from the polished surfaces 12 and 14 of the laser material 10, wherein the direction of the light propagation is indicated by the arrows. Alternate possible parasitic mode paths 16b and 16c are shown in FIGS. 1(b) and 1(c), respectively. Still other modes are possible. In particular, while transverse modes are shown in FIG. 1, longitudinal modes also exist. This cycling parasitic energy depletes the population inversion of the laser material, thus reducing the overall efficiency of the device. At best, the energy in the parasitic oscillations limits the drilling and cutting performance of the FPL when used in such applications by limiting the energy output per pulse and, therefore, the average output power. In the worst case however, the parasitic oscillations can reach dangerously high levels leading to significant material damage.

One way to reduce or eliminate parasitic oscillations in low power slab laser materials is to leave the edge faces 14 of the slab in a rough ground condition typically 600 grit, as is known from the articles "Parasitic Oscillations and Amplified Spontaneous Emission in Face-Pumped Total Internal Reflection Lasers," D.C. Brown et al., SPIE, Vol. 736, pp. 74–83, 1987, and "Parasitic Oscillations, Absorption, Stored Energy Density and Heat Density in Active-Mirror and Disk Amplifiers," D. C. Brown et al., Applied Optics, Jan. 15, 1978, Volume 17, No. 2, pp. 211–224. This is effective in reducing parasitic oscillations since the closed-loop TIR paths 16 are reduced since rays striking the ground edges 14 of the slap 10 are mostly scattered and refracted out of the material instead of being totally internally reflected. However, the ground finish leaves many damage sites, which have been shown to decrease the strength of the material. During operation, these damage sites may lead to significant material failure (cracking). Also in high power slab lasers, the rough ground edges 14 can contribute considerably to the distortion of the optically pumped material, thereby degrading the laser's beam quality.

In order to reduce the negative effects of ground edges 14, laser materials can be chemically etched prior to final polishing. The edge faces 14 are left in the etched condition when the remainder of the slab is polished. The etching increases the strength of the material by leaving a smoother, more damage-free material than do ground edges. Although the etched edge slab suppresses parasitic oscillations better than a polished edge slab, it does not suppress parasitic oscillations nearly as well as the ground edge slab.

Said articles also disclose the concept of beveling or canting the edge faces to reduce parasitic oscillations. However, since such bevels must extend to the ends of the slab, a laser incorporating such a slab would be difficult to seal. Also, since the pump faces each would have a different dimension, the slab is asymmetrical, which would result in asymmetrical thermo-optic distortion of the slab and asymmetrical surface deformation.

It is therefore an object of the present invention to reduce parasitic oscillations in a slab geometry laser material without causing cracking thereof or a reduction in laser performance, such as beam quality, efficiency, etc.

SUMMARY OF THE INVENTION

An article in accordance with the invention comprises a substantially rectangular longitudinal slab of laser material having a pair of opposing edge faces and a pair of opposing pump faces; and means for reducing parasitic oscillations including each of said edge faces having a concave portion.

A laser in accordance with the invention comprises a substantially longitudinal rectangular slab of laser material having a pair of opposing edge faces and a pair of opposing pump faces, each of said edge faces having a concave portion; at least a first optical pumping means for illuminating one of said pump faces; a reflector surrounding said slab and said lamp; first and second transparent plates respectively disposed proximate said pump faces, said first plate being disposed between said first pumping means and said slab; and a pair of insulating siderails respectively disposed on said edge faces.

BRIEF DESCRIPTION OF THE DRAWING

In the drawing corresponding elements have been given corresponding reference numerals.

DETAILED DESCRIPTION

Figure 1A:
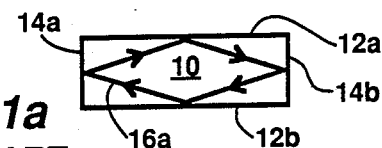
FIG. 1 is a cross-sectional view of a laser material in accordance with the prior art showing some possible parasitic mode paths.
Figure 1B:
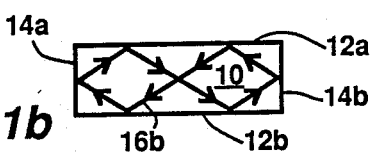
Figure 1C:
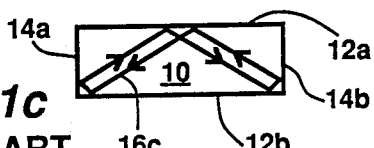
Figure 2:
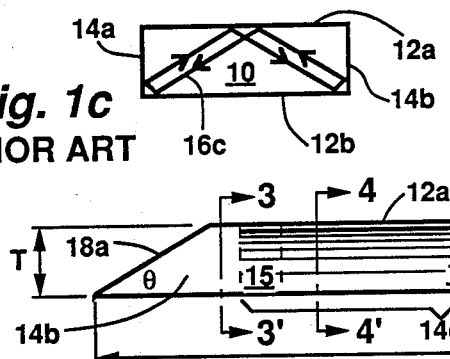
FIG. 2 is a plan view of a laser material slab in accordance with a first embodiment of the invention.
Figure 3:
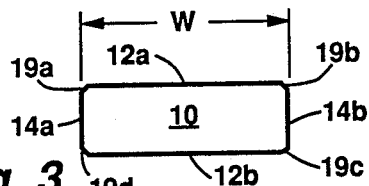
FIGS. 3 and 4 are cross-sectional views along line 3—3' and 4—4', respectively, in FIG. 2.
Figure 4:
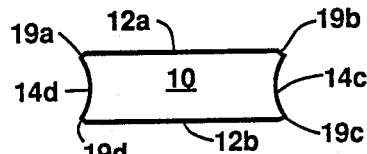

In FIG. 2 is shown a slab (substantially rectangular) geometry laser medium 10 having pump faces 12a and 12b sufficiently polished to achieve optical flatness, i.e., one eighth of the emitted wavelength. End faces 18a and 18b are cut at an angle $\theta$ of about 30 degrees (about the Brewster angle) to the longitudinal axis of the slab 10. If desired, any angle can be used for the end faces 18, if antireflection coatings (not shown) are provided on the ends 18. As shown in FIG. 3, the edge faces 14a and 14b at the ends of the slab 10 are straight and exactly perpendicular to the pump faces 12a and 12b as in the prior art of FIG. 1 so that conventional gaskets (not shown) can be used at the ends of body 10. In FIG. 4, and in accordance with the invention, the central portions 14c and 14d of the edge faces are transversely concave for transverse mode parasitic oscillation reduction. By "transversely concave" is meant that the curvature is seen on a cross-section transverse to the longitudinal axis of slab 10. As seen in both FIGS. 3 and 4, and as known in the art, in order to prevent chipped corners, the corners 19a, 19b, 19c, and 19d are chamfered. This is especially desirable in the concave portions 14c and 14d due to the sharp edges that would otherwise be present.

In a particular embodiment, slab 10 has a length (L) of about 20.5 cm, a thickness (T) of about 0.6 cm, and a width (W) of about 2.5 cm. Concave portions 14c and 14d have a length of about 17.5 cm, the maximum depth at the center thereof is about 0.01 cm, and radius of curvature thereof is about 1.5 inches (3.81 cm). In addition, the end portions 15 of the concave portion 14c are tapered, i.e., the maximum depth thereof is gradually reduced to zero the closer particular portions of the end portions 15 are to their adjacent edge faces 14b. Similarly, the end portions of concave portion 14d are tapered. This prevents sharp corners from being formed between the concave portions 14c and 14d and the edge faces 14b and 14a, respectively. Such sharp corners would reduce the strength of the medium 10 and might result in parasitic oscillation modes. The end portions 15 are about 2 to 3 mm in length. Other values can be used for all of the above given dimensions. Slab 10 is Nd:YAG with a one percent doping level of Nd by atomic weight; however, any laser medium can be used, e.g., Nd:glass, Er:YAG, Nd:GSGG, Nd:GGG, Ti:sapphire, etc.

Figure 5:
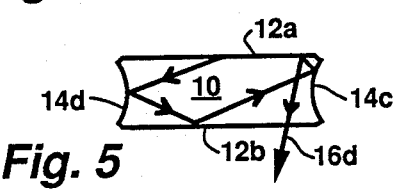
FIG. 5 shows a potentially parasitic path in the slab according to the invention.

As shown in FIG. 5, by the light ray 16d the concave portions 14c and 14d introduce a negative reflecting power such that any reflection will be divergent, thereby reducing the possibility of stable transverse parasitic laser modes being generated. Light rays are reflected off of the curved surfaces 14c and 14d such that closed-loop paths are very limited in number. Potentially parasitic rays are quickly refracted out of the slab 10 after only a few bounces since their angle is increasingly approaching normal incidence (past the critical angle for TIR) instead of making many cycles on a particular path at unchanging angles as seen in the purely rectangular cross-section slab 10 of FIG. 1. Without parasitic oscillations to deplete the population inversion in the lasing medium slab 10, extra energy is removed from the crystal slab 10 by the desired longitudinal lasing mode of the slab 10 and the resonator cavity (not shown), thereby increasing the output energy of the laser. If a maximum value for the input power is imposed on the laser to increase longevity of the device, this increased efficiency is a welcomed improvement since the material processing capabilities of the laser improve without increasing the stress in the crystal slab 10.

Figure 6:
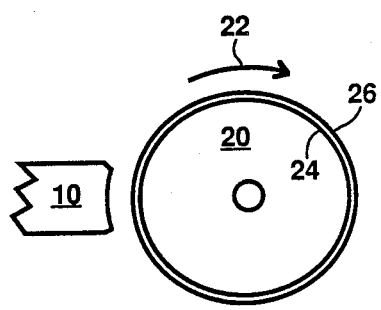
FIG. 6 shows a method of making a slab in accordance with a first embodiment of the invention.

In order to make the slab 10 in accordance with the invention, one starts with a rectangular slab. FIG. 6 shows the technique that may be applied to polish the edge faces 14 to the desired concave shape. The slab 10 is applied to a polishing wheel 20 (shown in cross-section) having a fine polishing compound thereon. Wheel 20 is rotating in the direction of arrow 22. The central portion of the concave sections 14c and 14d are produced by the wheel diameter indicated by numeral 24, while the tapered portions 15 are produced by the tapered portions of wheel 20 between numerals 24 and 26. Thereafter the chamfers on corners 19 are made by holding the edges of slab 10 to wheel 20. These polishing operations produce damage sites. After polishing, slab is chemically etched to remove damage sites, thereby strengthening the material. Then rough polishing is done to form the Brewster ends 18 and then fine polishing is done to ends 18 and the pump faces 12.

It will be appreciated that the present invention results in a more efficient laser medium slab without causing damage thereto, and, since there are no rough ground edges present, there in no reduction in laser performance.

Figure 7:
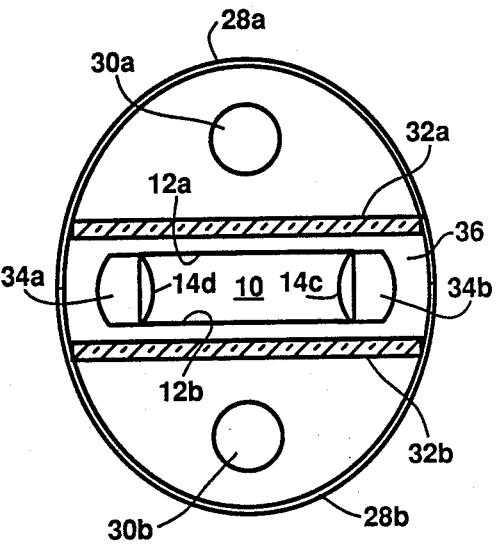
FIG. 7 is a cross sectional view showing a laser incorporating a slab in accordance with the invention.

FIG. 7 shows the invention as used in a laser similar to that shown in U.S. Pat. No. 3,679,999. A reflector has sections 28a and 28b surrounding optical pumping lamps 30a and 30b to provide light through transparent plates 32a and 32b, such as quartz, to the slab 10 in accordance with the invention. Lamps 30 cause population inversion in slab 10 and are 6 inches (15.24 cm) long, i.e., slightly shorter than the length of concave portions 14d and 14c, thereby ensuring that transverse parasitic mode suppression takes place over and beyond the entire pumped region of the slab medium 10. Instead of lamps, other optical pumping means, such as diode lasers, can be used. Insulating siderails 34a and 34b, such as quartz, are about 18 cm long, i.e., slightly longer than the concave portions 14c and 14d and are affixed thereto by room temperature vulcanized (RTV) silicone rubber adhesive (not shown), which fills up the concavities and is also present at the flat portions 14a and 14b. A coolant 36, such as water, a gas, etc., is flowed between the plates 32 in order to cool the pump faces 12. Insulating siderails 34 prevent the coolant 36 from contacting concave portions 14c and 14d and also greatly reduce heat conduction from slab 10 to coolant 36, thereby reducing any distortion in the emitted laser light that might occur due to deformation of slab 10 and a varying index of refraction due to thermal gradients therein.

Figure 8:
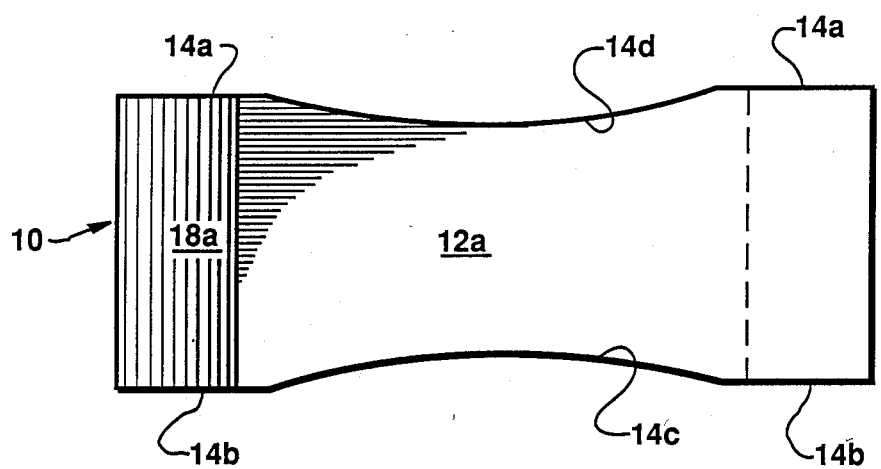
FIG. 8 is a top view of a slab in accordance with a second embodiment of the invention.

In the second embodiment of FIG. 8, concave portions 14c and 14d are longitudinally concave, i.e., their curvature can be seen in a cross-section or top view parallel to the longitudinal axis of slab 10. This embodiment reduces longitudinal mode parasitic oscillations in the same manner as described above for the suppression of transverse oscillations and can be made by the wheel 20 of FIG. 6 having a selected radius of curvature with the slab 10 held perpendicular to the position shown in FIG. 6.

In a particular embodiment, the slab 10 dimensions and length of concave portions 14c and 14d are as given above. The maximum depth of the concave portions 14c and 14d is about 0.05 cm and the radius of curvature thereof is about 7.5 meters.

Figure 9:
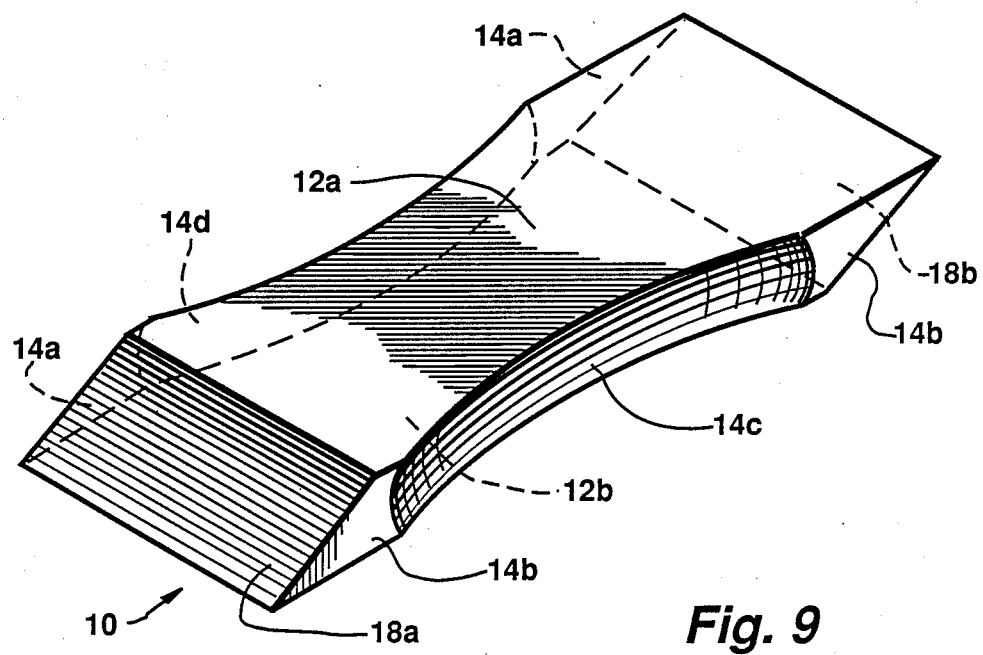
FIG. 9 is an isometric view of a third embodiment of the invention.

In FIG. 9 is shown a third embodiment of the invention wherein the concave portions 14c and 14d are both longitudinally and transversly concave i.e., they are toroidal sections, in order to reduce both longitudinal and transverse parasitic oscillation modes. This embodiment can be made by the wheel 20 if it has the shape of a section of a torus with selected orthogonal radii of curvature. Again, in a particular embodiment, the dimensions of slab 10 and the length of concave portions 14c and 14d are as given above. The maximum depth of both the longitudinal and transverse curves is about 0.05 cm and the radius of curvature for the longitudinal and transverse curves respectively are about 7.5 m and 0.9 cm.

What is claimed is:

1. An article for receiving a signal from an external pumping means, said article comprising:

a substantially rectangular longitudinal slab of laser material having a pair of opposing edge faces and a pair of opposing pump faces, said pump faces being substabtially planar and at least one of said pump faces being designated for receiving the signal from the pumping means; and means for reducing parasitic oscillations including each of said edge faces having a concave portion.

2. The article of claim 1 wherein each of said edge faces has a pair of straight portions respectively disposed at the ends thereof and each of said concave portions has a pair of tapered portions respectively disposed proximate said straight portions.

3. The article of claim 1 wherein each of said portions is transversely concave.

4. The article of claim 1 wherein each of said concave portions is longitudinally concave.

5. The article of claim 1 wherein each of said concave portions is both longitudinally and transversly concave.

6. The article of claim 1 wherein said slab has has chamfered corners.

7. The article of claim 1 wherein said slab has end faces disposed at about the Brewster angle.

8. The article of claim 1 wherein said slab comprises Nd:YAG.

9. The article of claim 8 wherein said Nd has a doping level of about one percent.

10. The article of claim 1 wherein each of said concave portions is toroidal in shape.

11. A laser comprising:

a substantially rectangular longitudinal slab of laser material having a pair of opposing edge faces and a pair of opposing pump faces, each of said edge faces having a concave portion;

at least a first optical pumping means for illuminating one of said pump faces;

a reflector surrounding said slab and said pumping means;

first and second transparent plates respectively disposed proximate said pump faces, said first plate being disposed between said first pumping means and said slab; and a pair of insulating siderails respectively disposed on said edge faces.

12. The laser of claim 11 wherein said pumping means has a length slightly less than the length of the concave portions.

13. The laser of claim 11 wherein said siderails have a length slightly greater than the length of said concave portions.

14. The laser of claim 11 further comprising a second optical pumping means for illuminating the remaining pump face and disposed in said reflector, said second plate being disposed between said second pumping means and said slab.

15. The laser of claim 11 further comprising a coolant disposed between said plates.

16. The laser of claim 11 wherein each of said concave portions is transversly concave.

17. The laser of claim 11 wherein each of said concave portions is longitudinally concave.

18. The laser of claim 11 wherein each of said portions is both longitudinally and transversely concave.

19. The laser of claim 11 wherein each of said portions is toroidal in shape.

20. The laser of claim 11 wherein said optical pumping means comprises a lamp.

* * * * *